Patented May 31, 1932

1,860,818

UNITED STATES PATENT OFFICE

KURT RÖHRE AND OTTO HEUSLER, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF ALKALI METAL PHOSPHATES

No Drawing. Application filed February 4, 1928, Serial No. 252,036, and in Germany February 18, 1927.

This invention relates to the production of alkali metal phosphates from materials containing so-called crude ferrous phosphid, which is obtained in large amounts as a by-product in certain industrial processes, for example, in the thermic production of phosphorus or phosphoric acid from crude mineral phosphates, carbon and silicic acid.

We have found that the phosphorus contained in the said by-product can be easily recovered in the form of alkali metal phosphates by heating the material containing the said ferrous phosphid together with an alkali metal sulfate, and preferably potassium sulfate, water vapor being introduced to the material to be treated either prior to or during the reaction.

The addition of water vapor has the effect of moderating the very strong exothermic reaction, and of thus avoiding the losses of phosphorus which would otherwise occur. In the treatment with water vapor, part of the so-called ferrous phosphid is slowly oxidized, very pure hydrogen being produced at the same time. In this way the main reaction takes place without a deleterious rise in temperature.

In many cases it will already suffice, if mixture of ferrous phosphid and alkali metal sulfate which has been well moistened or which contains water of crystallization, is employed, since water vapor will be obtained therefrom on heating to partially oxidize the said ferrous phosphid.

Water, water vapor and water of crystallization are equivalents for the purpose of the present invention and are hereinafter referred to for the sake of brevity as water vapor.

The temperature employed in the reaction need not be higher than that required for just sintering the charge.

Depending on the composition of the ferrous phosphid and the amount of alkali metal sulfate employed it may be advantageous to work either in an oxidizing atmosphere or with the addition of reducing agents such as carbon.

If high temperatures are employed part of the sulfur is evolved in the form of sulfur dioxid. In case materials rich in silicon are started from, it is advisable to add a ballast material, for example an excess of an alkali metal sulfate.

The reaction product obtained by the interaction of materials containing ferrous phosphid is lixiviated either by means of water or by means of end-liquors obtained from the treatment of earlier charges, a strongly basic solution of alkali metal phosphates being obtained. The residue contains the iron in the form of its oxids and sulfids, and the main amount of the silicic acid formed in the reaction is also contained therein. The alkali phosphate obtained, in particular potassium phosphate may be employed as a fertilizer.

In order to recover the potassium phosphate, in cases where potassium sulfate has been employed as initial material, concentrated phosphoric acid is preferably added to the solution obtained as above described until the mono-phosphate stage has been attained, the major portion of the phosphoric acid present thereupon separating from the solution in the form of mono-potassium phosphate. Further amounts of potassium phosphate may be obtained by concentrating the mother liquor, or the mother liquor may at once be returned to the lixiviating process. In cases where considerable amounts of potassium sulfate in excess are present in the solution besides potassium phosphate, the former salt is separated, preferably prior to neutralization by concentration and cooling of the alkaline or neutral solution.

The solutions of sodium salts are preferably worked up for the production of di- and tri-sodium phosphate, whereby excess of sulfate if such be present may be removed, after the mono-phosphate stage has been reached by the addition of phosphoric acid, and the solution then concentrated whereupon the phosphate is recovered in the form of di- or tri-sodium phosphate from the mother liquor, for example by the addition of fresh alkaline lyes thereto.

If desired the lyes obtained may, after a suitable neutralization, at once be worked up for the production of concentrated mixed fertilizers, for which purpose salts containing nitrogen are added.

The following example will further illustrate the nature of our said invention though it is understood that the invention is not limited thereto. The parts are by weight unless otherwise stated.

*Example*

1 part of ferrous phosphid containing 17 per cent of phosphorus and 13 per cent of silicon is treated with water vapor at 500° to 600° C. for eight hours. 250 parts by volume of hydrogen are thus obtained. The reaction product is heated with 2 parts of potassium sulfate at 700 to 800° C., no deleterious rise in temperature taking place.

If the ferrous phosphid is subjected to the same treatment, without having been pretreated with water vapor, the temperature rises rapidly to about 1200° C., the mass melting together and the material of the reaction vessel being very considerably attacked.

What we claim is:

1. A process for the production of alkali metal phosphates which comprises first treating ferrous phosphid with water vapor at a temperature and for a period of time sufficient to cause partial oxidation of the ferrous phosphid, and subsequently heating the reaction product with an alkali metal sulfate to a temperature at which the material sinters.

2. A process for the production of alkali metal phosphates which comprises treating ferrous phosphid with water vapor until the ferrous phosphid is partly oxidized, at temperatures of between about 500 and 600° C. and heating the reaction product with an alkali metal sulphate at 700 to 800° C.

3. A process for the production of alkali metal phosphates which comprises treating ferrous phosphid with water vapor for 8 hours at temperatures of between about 500° and 600° C. and heating the reaction product with potassium sulfate at 700° to 800° C.

In testimony whereof we have hereunto set our hands.

KURT RÖHRE.
OTTO HEUSLER.